June 2, 1925.

J. B. KIRBY 1,540,341

SHOCK ABSORBER

Filed April 16, 1921   2 Sheets-Sheet 1

Inventor,
James B. Kirby
by Harold Elmer Smith
Atty.

June 2, 1925.
J. B. KIRBY
SHOCK ABSORBER
Filed April 16, 1921    2 Sheets-Sheet 2
1,540,341
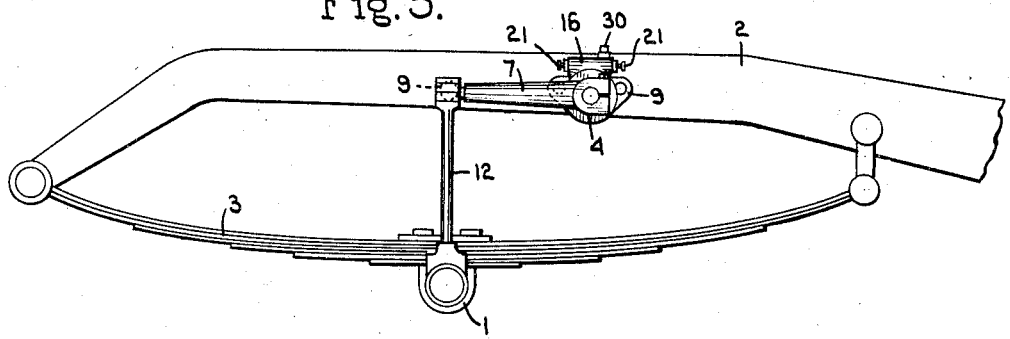
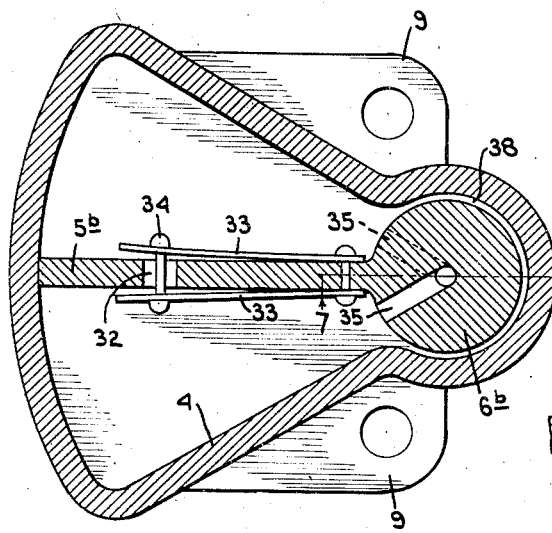
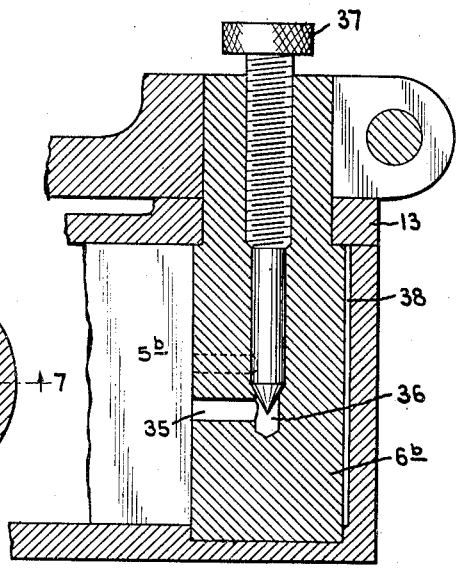
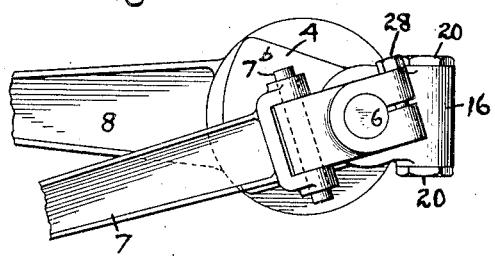
Inventor.
James B. Kirby
by Harold Elmo Smith
Atty.

Patented June 2, 1925.

1,540,341

UNITED STATES PATENT OFFICE.

JAMES B. KIRBY, OF CLEVELAND, OHIO.

SHOCK ABSORBER.

Application filed April 16, 1921. Serial No. 461,763.

*To all whom it may concern:*

Be it known that I, JAMES B. KIRBY, a citizen of the United States, residing at Cleveland, in the county of Cuyahoga and State of Ohio, have invented a certain new and useful Improvement in Shock Absorbers, of which the following is a full, clear, and exact description, reference being had to the accompanying drawings.

This invention relates to the class of devices known as shock absorbers, whereby the excessively violent movement of vehicle springs, especially those of automobiles, are restrained against unpleasant and destructive effect. The particular type of device involved herein is that wherein the relative movement of the parts is restrained or retarded by the movement of a liquid enclosed in a casing, and the objects of the invention are the provision of a device of great simplicity and of inexpensive construction which can be readily attached to and removed from the standard type of cars and which will present a retarding effect which depends upon the violence of the spring action and is unaffected by the initial load carried by the vehicle; the provision of a device of this character which can be readily adjusted as to the amount of opposition presented to the upward and downward movement of the body; the provision of a radically new type of automobile shock absorber; while further objects and advantages of this invention will become apparent as the description proceeds.

Figure 1:
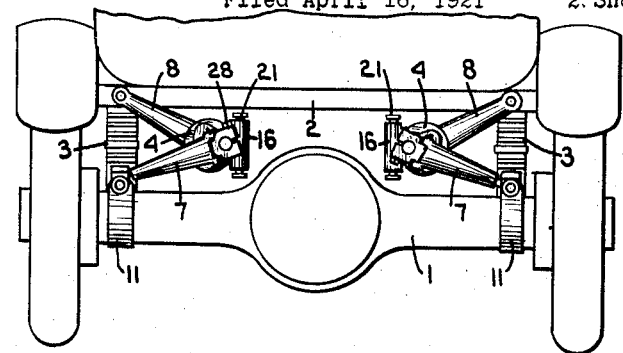
Figure 2:
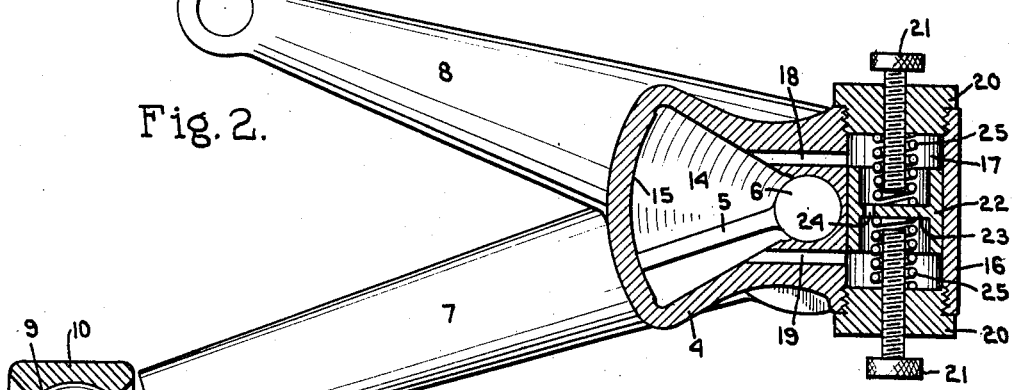
Figure 3:
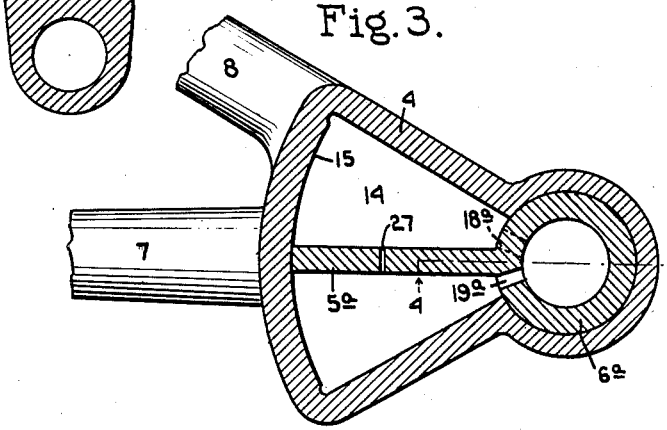
Figure 4:
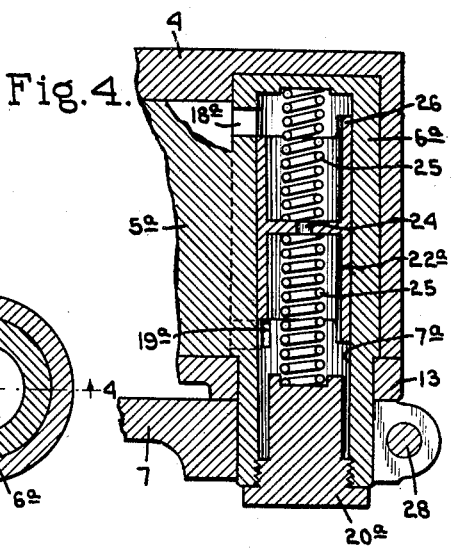

In the drawings accompanying and forming a part of this application I have shown certain embodiments of my said invention but without intent to limit myself to the particular structures therein shown, since the same are susceptible of great variations within the scope of my claims. In these drawings Fig. 1 is a rear-elevation of an automobile showing one form of my improved shock absorber applied thereto; Fig. 2 is an enlarged view of said shock absorber, a part of the same being shown in section; Fig. 3 is a detail view showing a slightly different arrangement of parts; Fig. 4 is a sectional view corresponding to the line 4—4 of Fig. 3 and looking in the direction of the arrows; Fig. 5 represents a side elevation of part of an automobile frame showing another form of my improved shock absorber applied thereto; Fig. 6 is a detail sectional view through yet another specific form; and Fig. 7 is a sectional view corresponding to the line 7—7 of Fig. 6; Fig. 8 is a detail view of the exterior of a modified form.

Describing by reference characters the parts shown in these drawings, 1 represents an axle, 2 the frame and 3 the spring of an automobile. My improved shock absorber comprises a hollow casing 4 suitably attached to one of such spring-connected members and having therein a segmental chamber provided with a closely fitting blade 5 carried by a pivot spindle 6 which is connected by means of a suitable arm 7 with the other of such spring-connected members. In Figs. 1, 2, and 3 the casing 4 is shown as integral with an arm 8 which is itself pivoted to that member to which it is attached, while in Figs. 5 and 6 I have shown said casing as provided with ears 9—9 adapted to be rigidly secured to the vehicle frame. In the first form one at least of the arm 7, 8 is attached in place by means of a ball joint 9 embraced by a socket member 10 which in Fig. 1 is shown as secured to the axle 1 by means of a band 11. In Fig. 5 the arm 7 carries the same kind of a ball which however is attached to the axle by means of the upright link 12. In all these forms, the casing is provided on one side with a removable cover 13, defining with the opposite wall of the casing a segmental chamber 14 in which the blade 5 fits closely. The wall of the chamber furthest from the pivot 6 is formed upon the arc of a circle as shown at 15 concentric with such pivot. The arm 7 may if desired be formed with a hinge joint 7$^b$ perpendicular to the spindle 6 as shown in Fig. 8, the better to provide for side sway of the vehicle body.

In Fig. 2 I have shown the wall of the casing as formed upon the opposite side of the pivot from the chamber 14 with an enlargement 16 provided with a cylindrical bore 17 whose axis is transverse to the pivot axis and whose opposite ends are connected by the ducts 18—19 with opposite sides of the chamber 14. I have shown the outer ends of this bore as closed by the screw plugs 20—20 in which are mounted the adjusting screws 21—21 between whose inner ends is located a piston 22 snugly fitting the bore 17. The length of this piston is sufficient to insure its easy sliding and I have here shown it as formed with a central transverse web 23 formed with an aperture 24 and having pressed against its opposite side the coil springs 25—25. This piston is arranged so that when in central position both ports 18 and 19 are open, but when displaced in either direction as by a sudden rush of liquid the port towards which it moves is correspondingly closed, thereby restraining the fluid movement and hence checking the movement of the vehicle spring. The amount of this closure is regulated by turning the screws 21—21, while the size of the hole 24 is chosen so as to permit the passage of enough fluid to ease the operation of the mechanism and to prevent its responding to shocks below a given degree of violence.

In the form of the invention shown in Figs. 3 and 4 the pivot 6ª is increased in size and the bore 7ª is formed directly therein, opposite ends of said bore being connected to the two sides of the chamber by the ducts 18ª and 19ª between which is mounted the slidable piston 22ª. This piston is held between balanced springs 25—25 as before and is similarly formed with a continuously open aperture 24, but instead of adjusting screws I have shown the ends of the piston as formed with rigid projections 26 adapted to prevent the complete covering of the port, omitting any special provision for adjustment. The end of the bore is closed by the screw plug 20ª. I have here shown the blade 5ª as formed with an aperture 27 adapted to supplement the aperture 24 and the normal leakage in taking care of the fluid movement. In each case the arm 7 is adjustably clamped to the pivot by suitable means such as the tangent screw 28, thus enabling the apparatus to be set so that the blade 5 will approximately bisect the chamber under conditions of normal load.

In Fig. 5 I have shown a mechanism identical with that illustrated in Figs. 1 and 2 except that the chamber 4 instead of being attached to an arm 8 is bolted directly to the frame with the chamber 16 uppermost, and in this view I have shown a filling plug 30 to aid in the introduction of the fluid.

In the modification shown in Figs. 6 and 7 I have shown the blade 5ᵇ as provided with an aperture 32 for the passage of the fluid and with valve means for controlling such passage in accordance with the violence of such movement, such valve means here consisting of a pair of leaf-springs 33—33 riveted to opposite sides of the blade and loosely connected by a link 34 which traverses the aperture. I have also shown the two sides of the blade as connected together by means of the ducts 35—35 communicating with a bore 36 formed in the pivot 6ᵇ and controlled by a needle valve 37. In this embodiment the spring valve is not adjustable, but the fixed opening is adjustable. In addition to the communication between the two sides of the blade caused by the different ducts and apertures, there is always a certain amount of leakage which must be taken into account, and which may even be made of considerable magnitude as indicated by the slot 38 in Figs. 6 and 7. It is imperative that certain provision be made at all times for liquid movement which might as well be made in this way as in any other.

The liquid employed is some non-freezing liquid such as glycerine or lubricating oil. By suitably adjusting the screws, or by suitably choosing the stiffness of the springs, the retarding effect can be gauged, not only absolutely but also relatively, to the end that the upthrow and downthrow can be restrained unequally. Owing to its construction this device can be made much more cheaply than the usual liquid-type of shock absorber and can be applied with the same facility as the friction type. It will be understood that many changes in point of detail can be made and that I do not restrict myself in any way except as recited in the annexed claims.

Having thus described my invention, what I claim is:

1. A shock absorber for vehicles comprising, in combination, a liquid containing casing, a liquid displacing member movable in said casing and fitting substantially the casing walls, means for securing said casing and member respectively to relatively movable parts of a vehicle, means permitting a controlled flow of liquid from one side of said member to the other, and means operative upon increase of hydrostatic pressure in either direction for obstructing the freedom of such flow.

2. In a shock absorber, in combination, a chambered member having a bearing located near one wall thereof, the chamber being of segmental shape with walls formed about the axis of said bearing as a center, a bearing member in said bearing, a lever secured to said bearing member outside of said chambered member, a blade secured to said bearing member inside said chamber and sweeping closely past the walls thereof, one of said members having a cylindrical bore therein, and ducts connecting opposite ends of said bore to the parts of said chamber which lie on opposite sides of said blade, a piston in said bore and adapted when displaced from central position to obstruct the passage through said ducts, and balanced springs normally holding said piston in an intermediate position.

3. In a shock absorber, in combination, a pair of members pivoted together upon a transverse axis, one of said members having a segmental, liquid-containing chamber formed about the pivot axis as a center and the other member having a blade fitting in said chamber and forming therewith a dash pot, there being one or more passageways for liquid from one side of said blade to the other, a spring valve associated with one of said passageways and arranged to close it proportionally to the liquid velocity, and regulable means defining the minimum opening of such passageways.

4. In a shock absorber, in combination, a chambered member, a lever member, a pivot spindle secured to said lever member and journaled in said chambered member, a blade projecting from said spindle inside said chamber and the chamber being of segmental shape and embracing said blade, said chambered member having a cylindrical bore therein and ducts connecting the ends of said bore with opposite sides of said chamber, a piston slidable in said bore adapted when displaced from central position to obstruct said ducts, springs interposed between said piston and the ends of the bore and tending to hold said piston in central position, and means limiting the travel of said piston.

In testimony whereof, I hereunto affix my signature.

JAMES B. KIRBY.